United States Patent [19]
Michael

[11] Patent Number: 5,388,650
[45] Date of Patent: Feb. 14, 1995

[54] NON-CRYOGENIC PRODUCTION OF NITROGEN FOR ON-SITE INJECTION IN DOWNHOLE DRILLING

[75] Inventor: Keith Michael, Spring, Tex.

[73] Assignee: Generon Systems, Houston, Tex.

[21] Appl. No.: 77,014

[22] Filed: Jun. 14, 1993

[51] Int. Cl.⁶ .................................. E21B 21/00
[52] U.S. Cl. ........................................... 175/71
[58] Field of Search ................. 175/71; 95/47, 138

[56] References Cited

U.S. PATENT DOCUMENTS 2,786,652  3/1957  Wells .
3,286,778  11/1966  Jackson .
3,612,192  10/1971  Maguire, Jr. .
4,136,747  1/1979  Mallory et al. .
4,161,222  7/1979  Pye ..................... 175/71 X
4,871,378  10/1989  Pinnau ..................... 95/47
5,207,806  5/1993  Lagree et al. ............... 95/47 X
5,275,640  1/1994  Schroter et al. ............ 95/138 X

*Primary Examiner*—William P. Neuder

[57] ABSTRACT

There is disclosed a method for oil or gas drilling or the drilling of a geothermal well and the like in which a compressed inert gas, produced by the non-cryogenic separation of air is delivered to the drilling region of the downhole.

9 Claims, 5 Drawing Sheets

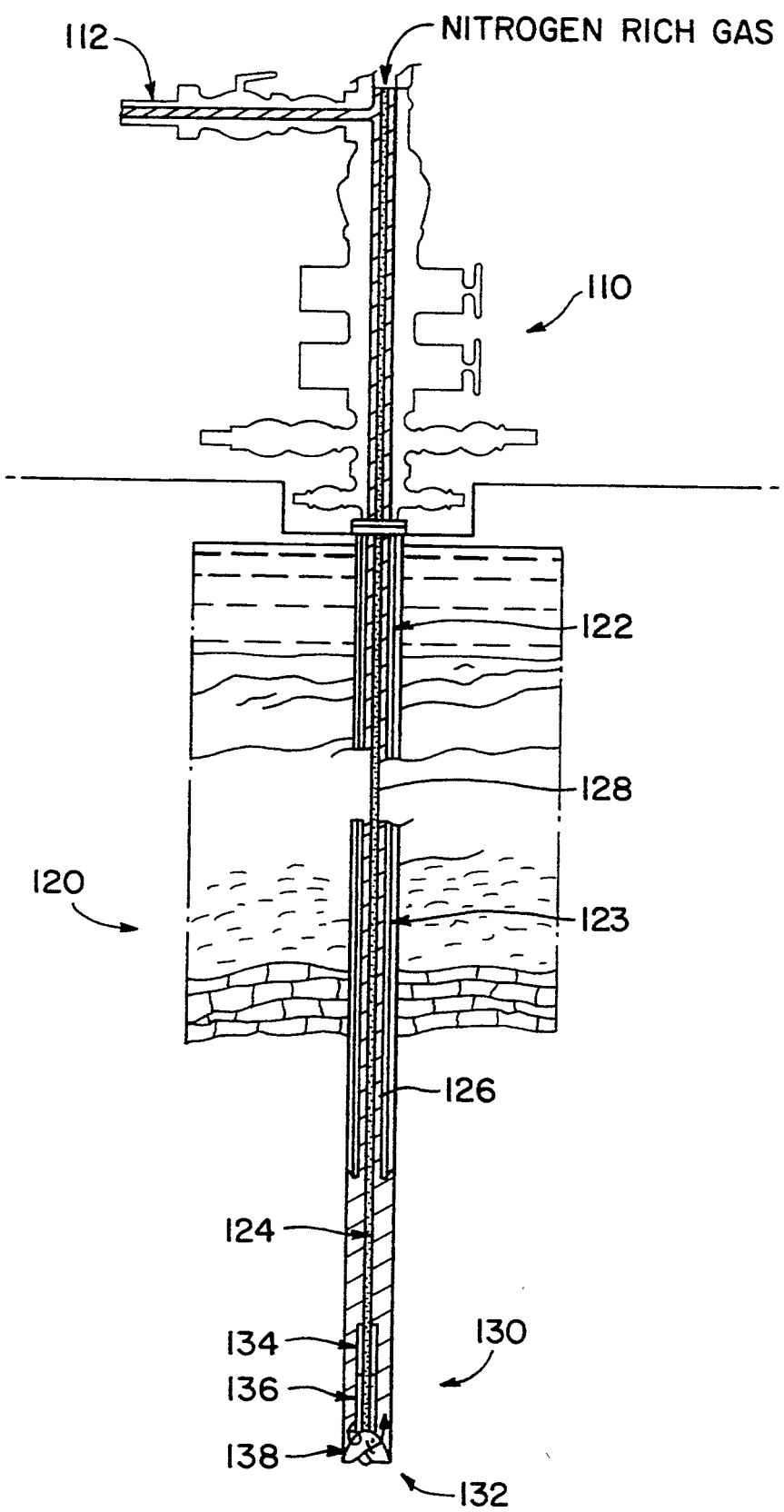

5,388,650

NON-CRYOGENIC PRODUCTION OF NITROGEN FOR ON-SITE INJECTION IN DOWNHOLE DRILLING

FIELD OF THE INVENTION

The present invention is directed to a method of drilling for oil, gas or geothermal wells and the like which employs an inert gas in the drilling region to remove drill cuttings. The inert gas, typically nitrogen gas, is supplied on-site by the preferential separation of air using a non-cryogenic source of the inert gas such as a membrane or a pressure swing adsorption system.

BACKGROUND OF THE INVENTION

In the drilling for oil or gas or geothermal wells and the like, the drilling apparatus requires a fluid in the drilling region around the drill bit to remove the drill cuttings. One such drilling fluid is drilling mud which is often used when large flows of water are present in the downhole (i.e. the region where drilling takes place below ground level). It has also been found that the injection of gas into the downhole results in faster drilling rates when substantial amounts of water are not present in the downhole.

Air has been used as the principal downhole drilling fluid for low water content drilling. Straight air drilling requires only that air be compressed and circulated such that drill cuttings are lifted from the downhole free of liquids. The air can be combined with a surfactant, foaming agent, water and/or mud for different applications.

The selection of air drilling systems over mud drilling systems is based on the feasibility of drilling the hole (e.g. the presence or absence of a substantial amount of water in the downhole as well as economics). The primary advantages of straight air drilling are greatly increased penetration rates, greater bit footage and fewer downhole drilling problems.

Downhole drilling with air, however, does have a number of disadvantages, one of the most important of which is the occurrence of downhole explosions or fire due to the presence of high levels of oxygen in air. Efforts have been made to reduce the hazards of air drilling by lowering the temperature of the air or by replacing air with an inert gas.

For example, J. Q. McGuire, Jr., U.S. Pat. No. 3,612,192 discloses a process for air drilling in which the air is cooled to cryogenic temperatures. The frozen air not only reduces the threat of downhole combustion but also freezes the ground to prevent the influx of water. As is well known, cooling to cryogenic temperatures is costly and requires additional heavy equipment which may not be readily available, particularly when drilling takes place in remote locations.

Another approach to eliminating the hazards of using air as a drilling fluid is to employ an inert gas. Such systems are disclosed for example, in N. C. Wells, U.S. Pat. No. 2,786,652 and J. G. Jackson, U.S. Pat. No. 3,286,778. While the source of the inert gas (e.g. nitrogen gas) used in these systems is not set forth, it is common to use liquid nitrogen as the source of gas. Liquid nitrogen, however, is disadvantageous because it is considerably more expensive to use than air and difficult to obtain in remote locations.

An effort has been made to come up with alternative sources of nitrogen gas for use as a drilling fluid. H. E. Mallory, et al, U.S. Pat. No. 4,136,747 discloses a method of drilling in which nitrogen gas is obtained from the exhaust gas of engines. While such methods are of interest, they have not been commercialized on a large scale because of the high cost, difficulty in implementation, and technical problems such as the corrosive nature of the products of combustion.

It would therefore be desirable to devise a method by which an inert gas, typically nitrogen gas, may be conveniently and efficiently supplied to the downhole of a drilling operation in a manner which eliminates the problems associated with cryogenic nitrogen and other sources of nitrogen gas.

SUMMARY OF THE INVENTION

The present invention is generally directed to a method for drilling for oil and/or gas or a geothermal well and the like in which a compressed inert gas is delivered to the downhole. The inert gas is obtained from an on-site non-cryogenic source. In particular, the source of the inert gas is air which is preferentially separated into an inert gas rich fraction and an oxygen waste gas fraction such as by membrane separation or by pressure swing adsorption or the like.

BRIEF DESCRIPTION OF THE DRAWINGS

The following drawings in which like reference characters indicate like parts are illustrative of embodiments of the invention and are not intended to limit the invention as encompassed by the claims forming part of the application.

FIG. 5 is a schematic view of a downhole drill stem arrangement showing the delivery of the inert gas to the drilling region.

DETAILED DESCRIPTION OF THE INVENTION

The present invention is directed to the on-site non-cryogenic production of an inert gas, typically a nitrogen rich gas and its delivery as a drilling fluid in the drilling of oil and/or gas or geothermal wells and the like. As used herein the term "nitrogen rich gas" shall refer to a gas containing predominantly nitrogen gas and no more than 10% oxygen gas by volume. The nitrogen rich gas is produced from air by a number of different methods including membrane separation, pressure swing adsorption, vacuum swing adsorption, fuel cells and the like.

Figure 1:
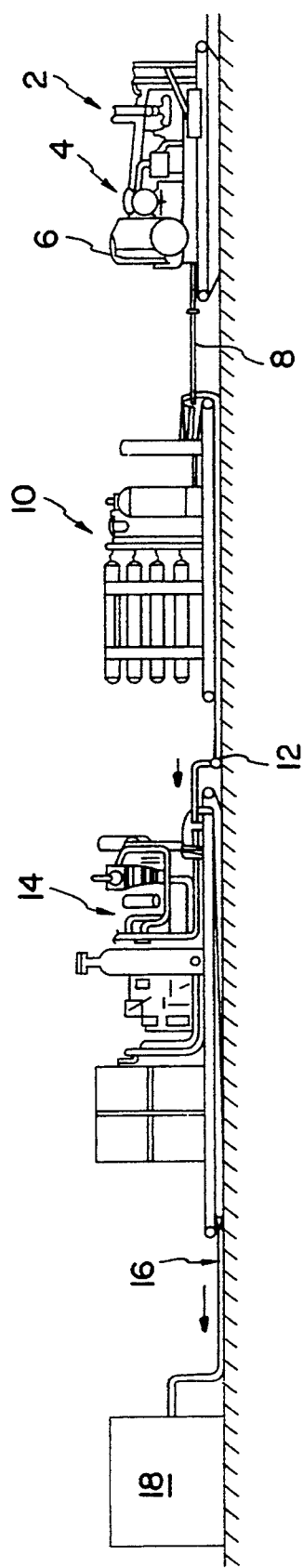
FIG. 1 is a schematic view of an embodiment of the invention showing an above surface apparatus for generating a nitrogen rich gas from an air-separation membrane to be delivered to a drilling region.

Referring to FIG. 1 there is shown an above ground installation for producing a nitrogen rich gas using membrane separation and for delivery of the nitrogen rich gas to the drilling region. A feed air compressor 2 includes an intake port 4 for receiving ambient air and a compressor 6 for pressurizing the air to a suitable pressure, typically in the range from about 100 to 350 psig.

The compressed air is sent through a conduit 8 to an air separation membrane system shown generally by numeral 10, such as the high performance air separation membrane system manufactured by Generon Systems of Houston, Tex.

The membrane is composed of bundles of hollow fiber, semi-permeable membranes which are assembled parallel to a central core tube. The bundle is placed into an outer case to form an air separation module. The air is divided into two streams; a nitrogen rich stream and a stream rich in oxygen and water vapor.

When the compressed air is introduced to the feed side of the membrane fibers, the air travels down the bore of the hollow permeable fibers. Oxygen, water vapor and other "fast gases" pass through to the outside of the fibers. The oxygen-rich gas stream then flows through the fiber bundle to the periphery of the outer case of the separator system where it is discharged as a by-product.

While all but a small fraction of the oxygen passes through the membrane material to the exterior of the hollow fibers, most of the nitrogen present in the feed air is contained within the hollow fiber membrane. As a result, the nitrogen rich gas is effectively separated from the feed air and exits the membrane system 10 via a conduit 12 for entry into an optional booster compressor 14.

The booster compressor 14 is employed to elevate the pressure of the nitrogen rich gas. The pressure of the gas obtained from the air separation membrane system 10 is from about 100 to 200 psig. The booster compressor 14 is capable of raising the pressure of the nitrogen rich gas up to or exceeding 4500 psig and even as high as about 10,000 psig, but typically in the range of from about 1,000 to 2,000 psig. The highly compressed nitrogen rich gas leaves the booster compressor 14 via a conduit 16 and is sent to a surface equipment installation 18 of the drilling operation as explained in detail hereinafter.

Figure 2:
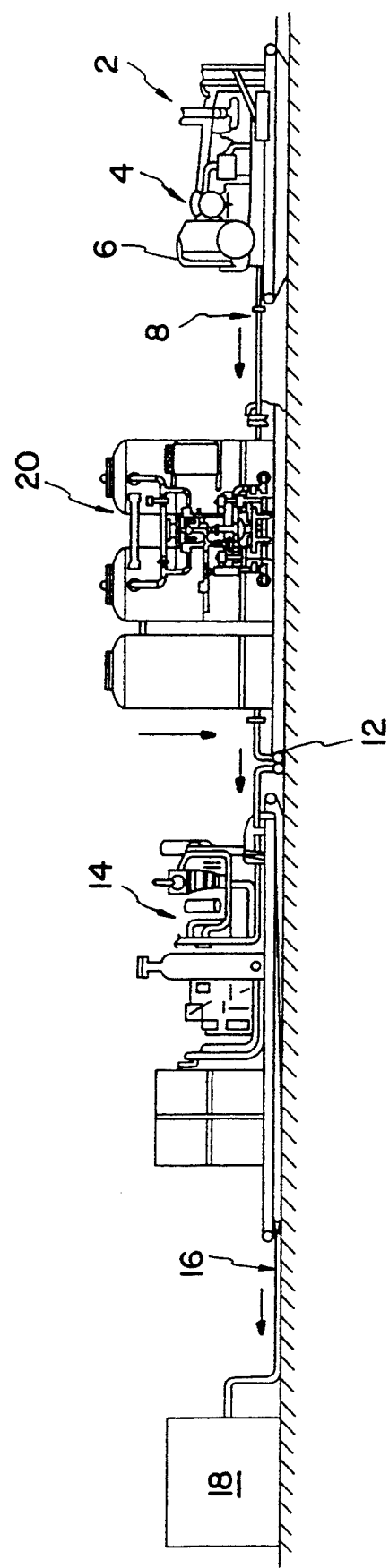
FIG. 2 is a schematic view similar to FIG. 1 in which a nitrogen rich gas is generated by a pressure swing adsorption unit.
Figure 3:
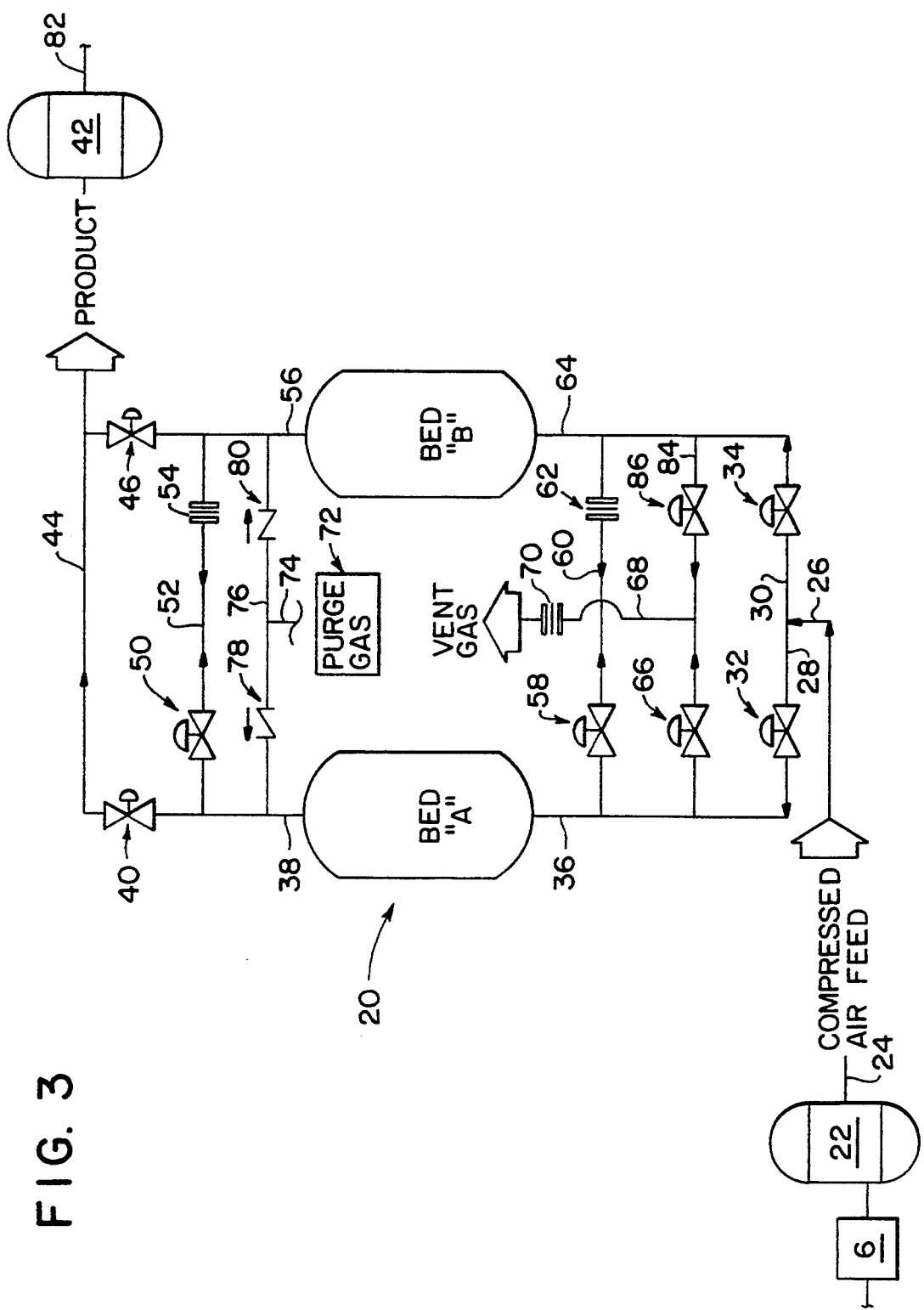
FIG. 3 is a schematic view of a two bed pressure swing adsorption system for generating a nitrogen rich gas.

The nitrogen rich gas may also be produced by a pressure swing adsorption system in accordance with the present invention. Referring to FIGS. 2 and 3, there is disclosed a pressure swing adsorption unit 20 having two beds "A" and "B". It should be understood, however, that the present invention is applicable to pressure swing adsorption units having an alternate construction such as a greater number of beds.

Referring to FIG. 3, air from a source (not shown) is fed to a compressor 6 to raise the pressure of the air, to accumulate compressed air during the non-production phase and to output compressed air during peak loading of the beds. The compressed air is fed to a storage vessel 22. The compressed air is then fed via the conduit 24, 26 to an outlet 28 leading to bed A and an outlet 30, leading to bed B. Each outlet 28, 30 is controlled by respective valves 32, 34. When valve 32 is opened, allowing the compressed air to reach bed A, valve 34 remains closed so that bed B may undergo regeneration during the depressurization phase of the pressure swing adsorption unit 20.

The compressed air enters the bed A through the open valve 32 via a conduit 36. The bed A contains at least one adsorption material capable of preferentially adsorbing oxygen and other waste gases. The preferred adsorbents are selected from molecular sieves and silica gel. As a result, substantially pure nitrogen passes out of the bed A through a conduit 38, a valve 40 and into a nitrogen storage vessel 42 via a product line 44 for passage via a conduit 82 to the optional booster compressor 14 shown in FIG. 1.

While bed A is producing nitrogen gas, bed B is at atmospheric pressure. Upon completion of the nitrogen production cycle in bed A, the system undergoes equalization to raise the pressure in bed B to an intermediate pressure. This is accomplished by closing the nitrogen product valves 40, 46 and the compressed air intake valves 32, 34. Thus, the input of compressed air and the output of nitrogen product are temporarily suspended.

Equalization is accomplished by passing a portion of the pressurized gas from the top of the bed A via a conduit 38, valve 50, a conduit 52, restrictive orifice 54, through a conduit 56 and into the top of the bed B. In addition, pressurized gas is passed from the bottom of the bed A via the conduit 36, a valve 58, a conduit 60, a restrictive orifice 62 and a conduit 64 into the bottom of bed B.

Once equalization is completed so that bed A and B are at similar pressures, bed A undergoes regeneration by depressurizing to atmospheric pressure to remove the oxygen enriched waste gases. This is accomplished by closing the equalization valves 50, 58 and opening a regeneration valve 66 for the bed A. The waste gas is then vented to the atmosphere through a conduit 68 and a restrictive orifice 70. As a consequence, the bed A is regenerated.

Further cleansing of the bed A may be made by passing a purge gas, such as substantially pure nitrogen gas, from a source 72, through conduits 74 and 76, respectively, a valve 78 and into bed A via the line 38. When the bed B is further cleansed, the purge gas passes through the conduits 74 and 76, respectively, a valve 80 and the conduit 56. After purging, the adsorbents are ready for adsorbing waste gases in a new nitrogen production cycle.

Since the pressure in bed B has been raised to an intermediate pressure, it is ready to receive compressed air. The compressed air is provided through the valve 34 and the conduit 64. It may be necessary, in order to get sufficient compressed air to quickly load bed B up to operating pressure, for the compressed air feed generated by the compressor 6 to be supplemented by compressed air already stored in the storage vessel 22.

Once bed B has been loaded, the valve 46 is opened, allowing product gas to enter the product line 44 via the conduit 56 from which it enters the storage vessel 42. A distribution conduit 82 extends from the storage vessel 42 to provide a flow of nitrogen rich product gas to the booster compressor 14 shown in FIG. 1.

After nitrogen production in bed B is completed, the valve 46 is closed as is the valve 34 to stop the compressed air feed. The equalization circuit is activated by opening valves 50, 58 and the pressurized gas is fed from the top and bottom of bed B to bed A to raise the pressure therein to an intermediate pressure level. Bed B is then depressurized by eliminating the oxygen rich waste gases which are sent via the conduits 64, 84 through a valve 86 to the atmosphere via the conduit 68 and restrictive orifice 70.

Thereafter, compressed air from the compressor 6 and the storage vessel 22 is fed to bed A through the valve 32 via the conduit 36 to raise bed A to the desired operating pressure thereby commencing the nitrogen production cycle from bed A which passes into the booster compressor 14.

Figure 4:
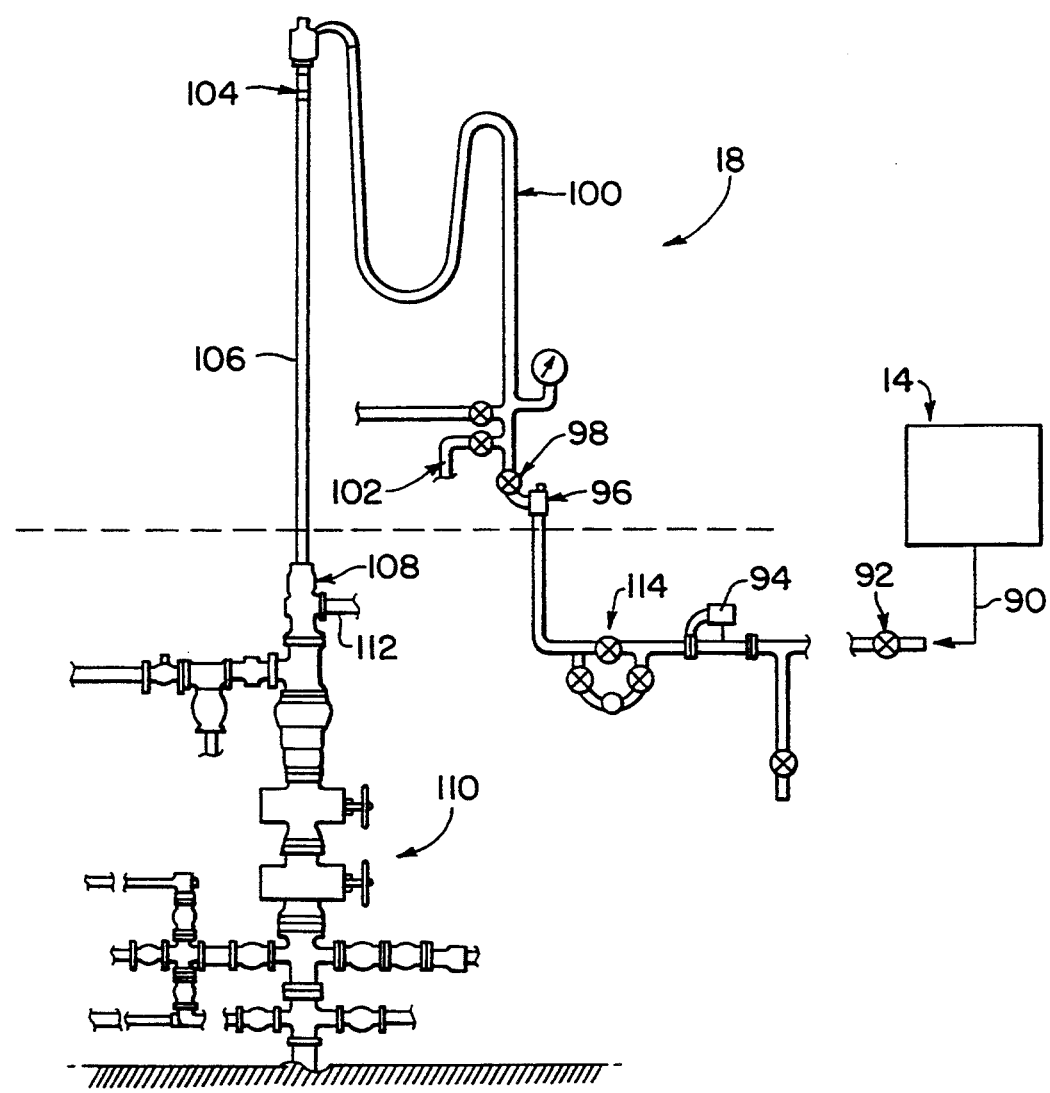
FIG. 4 is a schematic view of a surface equipment installation for delivering the inert gas to the drilling region.

The nitrogen rich gas, after compression up to as high as 10,000 psig in the booster compressor 14, is sent to surface equipment installation shown in FIG. 4 then to the drill stem arrangement shown in FIG. 5.

Referring to FIG. 4, the high pressure nitrogen rich gas obtained from the booster compressor 14 is sent to the surface equipment 18 via a conduit 90 through a main block valve 92. The flow rate of the nitrogen rich gas is typically measured by an orifice meter 94. The metered nitrogen rich gas is sent through an adjustable choke 96 and a pressure shut off valve 98 before entering a standpipe 100. Mud can be added to the standpipe 100 through a conduit 102 should drilling mud or aerated mud be required for downhole circulation or occasionally to create sufficient hydrostatic pressure head to terminate circulation, or "kill" the well.

The nitrogen rich gas is fed through a Kelly cock or swivel 104, through a Kelly string 106 and into a Kelly packer 108. The Kelly string is a square or hexagonally shaped pipe which can readily be rotated in the rotating Kelly packer 108. This causes the entire drill stem assembly 124 and the drill bit 138 (see FIG. 5) to rotate during drilling operations.

The nitrogen rich gas continues to flow until it reaches a drill stem assembly 124 which is typically connected in lengths called pipe stands. The drill stem assembly 124 is fed through the well head assembly (shown generally by numeral 110) which may contain a series of pipe rams, vents and choke lines. As will be explained hereinafter, there is provided an outlet 112 which is connected to a blooey line for discharging the exhaust nitrogen gas and drill cuttings.

The surface installation may optionally include an injector manifold 114 for injecting chemicals, such as surfactants and special foaming agents, into the nitrogen rich gas feed stream to help dissolve mud rings formed during drilling or to provide a low density, low velocity circulation medium of stiff and stable foam chemicals to cause minimum disturbance to unstable or unconsolidated formations.

Extending below the surface of the ground into the downhole is the drilling stem arrangement which provides a pathway for the flow of pressurized nitrogen rich gas to the drilling region. There is also provided a second pathway for the flow of nitrogen gas and the drill cuttings out of the downhole and away from the drilling operation.

Referring to FIG. 5, the drilling stem arrangement shown generally by numeral 120 includes a surface pipe 122 and casing 123 and the drill stem assembly 124 running concentrically with and spaced apart from the surface pipe 122 and casing 123 to define a pathway 126 for the return nitrogen rich gas and the drill cuttings. The center of the drill stem assembly 124 provides a pathway 128 for the flow of nitrogen rich gas to the drilling region. At the end 130 of the drill stem arrangement 120 is the drilling region 132 which includes a conventional tool joint 134, a drill collar 136 ad a drill bit 138.

In operation, the nitrogen rich gas produced by the air separation membrane system 10 or the pressure swing adsorption system 20 or other non-cryogenic system typically has a nitrogen content of at least about 85% by volume, preferably at least about 95% by volume, and an oxygen content of no more than 10% by volume, preferably less than about 5% by volume. The nitrogen rich gas is sent to a booster compressor 14 where the pressure is raised to as high as 10,000 psig or more, typically in the range of about 1,000 to 2,000 psig. The pressurized nitrogen rich gas is sent to the surface installation equipment 18 where it is monitored and metered into the downhole through the pathway 128 within the drill stem assembly 124.

Because the nitrogen rich gas is under pressure, it swirls around the drilling region 132 with sufficient force and velocity to carry the drill cuttings upwards into the pathway 126. The drill cutting containing stream then exits the outlet 112 of the surface installation equipment 18 where it is carried to a blooey line and eventually discarded into a collection facility, typically at a location remote from the actual drilling site.

The production of a nitrogen rich gas in accordance with the present invention and its delivery to the downhole is less costly and more reliable than conventional systems using cryogenic nitrogen and the like.

EXAMPLE

The flow rate of nitrogen rich gas to the drilling region of an oil and/or gas well or a geothermal well can vary over a wide range depending on the size of the downhole, the depth of the well, the rate of drilling, the size of the drilling pipe, and the makeup of the geologic formation through which the well must be drilled.

A typical drilling operation will require the production of from 1,500 to 3,000 standard cubic feet per minute (scfm) of nitrogen gas from an air separation system which can be anyone of a number of conventional systems including an air membrane separation system or a pressure swing adsorption system.

The purity of the nitrogen gas may vary, but is nominally set at no more than about 5% by volume of oxygen. The resulting nitrogen rich gas is then pressurized up to a pressure of from about 1,500 to 2,000 psig before being passed to the drilling region.

An average drilling operation will take about two weeks, although difficult geologic formations may require several months of drilling. The nitrogen rich gas delivery system is designed for continuous operation and all of the nitrogen rich gas is generated on-site without the need for external nitrogen replenishment required for cryogenically produced liquid nitrogen delivery systems.

What is claimed is:

1. A method for drilling for oil or gas or a geothermal well in which a compressed inert gas is delivered to a drilling region within a downhole, the improvement comprising:
   (a) removing at least a substantial portion of the oxygen contained within a feed stream of air at the site of said drilling to produce an inert rich gas and an oxygen enriched waste gas; and
   (b) delivering the inert rich gas to the drilling region within the downhole.

2. The method of claim 1 wherein the inert rich gas is nitrogen rich gas.

3. The method of claim 2 wherein step (a) comprises passing a feed stream of air through a membrane which preferentially separates nitrogen gas from the other gaseous components of air.

4. The method of claim 2 wherein the step of removing at least a substantial portion of oxygen comprises passing a feed stream of air through a pressure swing adsorption unit containing an absorbent which preferentially adsorbs oxygen and other gases contained within the feed stream of air to form the nitrogen rich gas.

5. The method of claim 2 wherein the nitrogen rich gas contains at least 85 volume percent of nitrogen.

6. The method of claim 2 wherein the nitrogen rich gas contains at least 95 volume percent of nitrogen.

7. The method of claim 2 further comprising raising the pressure of the nitrogen rich gas to at least 1,000 psig before delivering the nitrogen rich gas to the drilling region.

8. The method of claim 2 wherein the pressure of the nitrogen rich gas is raised to about 1,000 to 2,000 psig.

9. The method of claim 1 further comprising varying the oxygen content of the inert rich gas prior to the delivery of the inert rich gas to the drilling region within the downhole.

* * * * *

UNITED STATES PATENT AND TRADEMARK OFFICE
CERTIFICATE OF CORRECTION

PATENT NO. : B1 5,388,650
DATED : September 16, 1997
INVENTOR(S) : Michael

It is certified that error appears in the above-indentified patent and that said Letters Patent is hereby corrected as shown below:

Cover page: Item: [75] Keith Michael, Spring, Tex.;

Rodney G. Huskey, Grand Junction, Col.;

Paul D. Allan, Houston, Tex.

Signed and Sealed this

Sixteenth Day of May, 2000

Attest:

Q. TODD DICKINSON

*Attesting Officer*     *Director of Patents and Trademarks*

UNITED STATES PATENT AND TRADEMARK OFFICE
CERTIFICATE OF CORRECTION

PATENT NO. : 5,388,650
DATED : February 14, 1995
INVENTOR(S) : Michael

It is certified that error appears in the above-identified patent and that said Letters Patent is hereby corrected as shown below:

Cover page:      [75]    Keith Michael, Spring, Tex.;
Rodney G. Huskey, Grand Junction, Col.;
Paul D. Allan, Houston, Tex.

Signed and Sealed this

Nineteenth Day of September, 2000

Attest:

Q. TODD DICKINSON

*Attesting Officer*        *Director of Patents and Trademarks*

REEXAMINATION CERTIFICATE (3327th)
United States Patent [19]
Michael

[11] B1 5,388,650
[45] Certificate Issued Sep. 16, 1997

[54] NON-CRYOGENIC PRODUCTION OF NITROGEN FOR ON-SITE INJECTION IN DOWNHOLE DRILLING

[75] Inventor: Keith Michael, Spring, Tex.

[73] Assignee: MG Nitrogen Services, Inc., Malvern, Pa.

Reexamination Request:
No. 90/004,112, Jan. 22, 1996

Reexamination Certificate for:
Patent No.: 5,388,650
Issued: Feb. 14, 1995
Appl. No.: 77,014
Filed: Jun. 14, 1993

[51] Int. Cl.$^6$ .................................................... E21B 21/00
[52] U.S. Cl. .................................................... 175/71

[56] References Cited

FOREIGN PATENT DOCUMENTS 2186682  8/1987  United Kingdom.

OTHER PUBLICATIONS

"Membrane Separation Offers Low-cost Inert Gas Safety", Ocean Industry, Jul. 1990.
1991–1992 Catalog Stewart & Stevenson Petroleum Products.
"Nitrogen Generators" Power News, vol. 31–No. 1, Spring 1991.
"Drilling With Air", Earl R. Bruno, The Petroleum Engineer, Jan., 1956, B21–B24.
"Out of Thin Air", Suzanne Shelley, Chemical Engineering, Jun. 1991 pp. 30–41.
"Development of the Cotton Valley Geopressure Zone in Panola County, Texas, Using Air/N Drilling and Openhole Completion Techniques" J. E. Smith, et al. Society of Petroleum Engineers (SPE 14657), Tyler, Texas, Apr. 21–22, 1986.
"Liquid Nitrogen Developments and Applications in Drilling and Completion Operations", S.P. Shouldice, 15th Annual Technical Meeting, P.&N.G. Division, C.I.M., Calgary, May, 1964.
"Use of An Inert Drilling Fluid to Control Geothermal Drill Pipe Corrosion", Billy C. Caskey, Corrosion/81, Paper 224, Apr. 6–10, 1981.

*Primary Examiner*—William P. Neuder

[57] ABSTRACT

There is disclosed a method for oil or gas drilling or the drilling of a geothermal well and the like in which a compressed inert gas, produced by the non-cryogenic separation of air is delivered to the drilling region of the downhole.

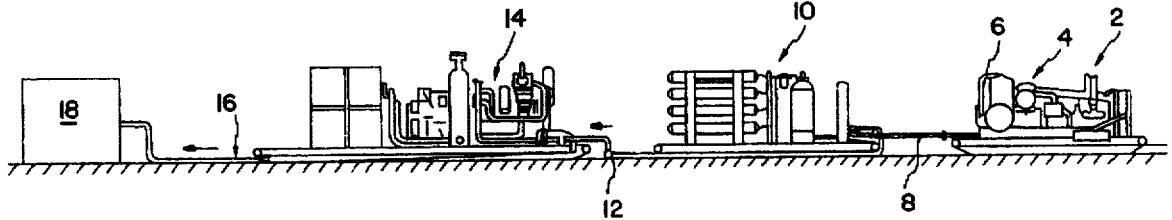

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–9, dependent on an amended claim, are determined to be patentable.

New claims 10 and 11 are added and determined to be patentable.

1. A method for drilling for oil or gas or a geothermal well in which a compressed inert gas is delivered to a drilling region within a downhole, the improvement comprising:

(a) removing at least a substantial portion of the oxygen contained within a feed stream of air at the site of said drilling to produce an inert rich gas and an oxygen enriched waste gas; and (b) delivering the inert rich gas *as a drilling fluid* to the drilling region within the downhole *with sufficient force and velocity to carry the drill cuttings upwards from the drilling region.*

*10. A method according to claim 1 wherein the step of delivering the inert rich gas is designed to be continuously operated.*

*11. A method according to claim 1 wherein on the inert rich gas is delivered in the range of about 1500 scfm to 3000 scfm.*

* * * * *